United States Patent
Ito et al.

(10) Patent No.: US 9,676,424 B2
(45) Date of Patent: Jun. 13, 2017

(54) SERVICE HOLE COVER AND UNIT MOUNTING STRUCTURE FOR VEHICLE

(71) Applicant: TOYOTA JIDOSHA KABUSHIKI KAISHA, Toyota-shi, Aichi-ken (JP)

(72) Inventors: Keita Ito, Nisshin (JP); Masahiro Ishikawa, Toyota (JP); Yutaka Yamada, Kariya (JP); Kenichiro Yoshimoto, Tokai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/426,069

(22) PCT Filed: Jun. 18, 2014

(86) PCT No.: PCT/JP2014/066209
§ 371 (c)(1),
(2) Date: Mar. 4, 2015

(87) PCT Pub. No.: WO2015/037298
PCT Pub. Date: Mar. 19, 2015

(65) Prior Publication Data
US 2016/0176445 A1    Jun. 23, 2016

(30) Foreign Application Priority Data
Sep. 13, 2013   (JP) .................. 2013-190599

(51) Int. Cl.
*B60K 1/04*    (2006.01)
*B62D 25/24*   (2006.01)
*B62D 25/20*   (2006.01)

(52) U.S. Cl.
CPC ............... *B62D 25/24* (2013.01); *B60K 1/04* (2013.01); *B62D 25/20* (2013.01)

(58) Field of Classification Search
CPC .......... B62D 25/24; B62D 25/20; B60K 1/04
USPC ......................................... 296/37.14, 193.07
See application file for complete search history.

(56) References Cited

U.S. PATENT DOCUMENTS

| 8,313,121 | B2* | 11/2012 | Rolfe | B60K 3/04 180/302 |
| 2011/0297467 | A1* | 12/2011 | Iwasa | B60K 1/04 180/65.31 |
| 2013/0127200 | A1* | 5/2013 | Saeki | B60K 1/04 296/37.14 |
| 2014/0326524 | A1* | 11/2014 | Ogushi | B60K 1/04 180/68.5 |

FOREIGN PATENT DOCUMENTS

| CN | 2626768 Y | 7/2004 |
| CN | 103129360 A | 6/2013 |
| JP | 09226483 A * | 9/1997 |
| JP | 2009-083601 A | 4/2009 |
| JP | 2013-107542 A | 6/2013 |
| JP | 2013-112225 A | 6/2013 |

* cited by examiner

*Primary Examiner* — Pinel Romain
(74) *Attorney, Agent, or Firm* — Oliff PLC (57) ABSTRACT

A ceiling portion of a service plug cover that is made of resin is convex toward a vehicle vertical direction lower side (floor panel side), and a groove-shaped concave portion is formed in a top surface. Further, the concave portion of the top surface of the ceiling portion is groove-shaped, and both end portions thereof in a groove direction (vehicle longitudinal direction) are open.

9 Claims, 10 Drawing Sheets

SERVICE HOLE COVER AND UNIT MOUNTING STRUCTURE FOR VEHICLE

TECHNICAL FIELD

The present invention relates to a service hole cover and to a unit mounting structure for a vehicle.

BACKGROUND ART

An electric automobile, in which a battery unit having a service plug is mounted beneath a floor panel, is disclosed in Japanese Patent Application Laid-Open (JP-A) No. 2009-083601. The service plug is structured so as to be able to electrically cut-off the electrical circuits of the battery module by being operated manually. Further, a boot mounting hole for operating the service plug is formed, and a cap member that closes this boot mounting hole is mounted by bolts. Further, an erroneous assembly preventing convex portion that is shaped so as to be convex downward is formed at the central portion of this cap member.

The erroneous assembly preventing convex portion at the central portion of this cap member contributes to improving the strength of the cap member. However, the top surface of the cap member is recessed due to the erroneous assembly preventing convex portion being formed. Further, due to water collecting in this recess over a long period of time, the cap member deteriorates and is easily damaged. Accordingly, there is room for improvement with regard to this point.

Note that related techniques are disclosed in JP-A No. 2013-107542 and JP-A No. 2013-112225.

SUMMARY OF INVENTION

Technical Problem

In consideration of the above-described circumstances, an object of the present invention is to improve the strength of a service hole cover while ensuring the draining performance of the top surface of the service hole cover.

Solution to Problem

A service hole cover of a first aspect comprises: a cover main body that is removably provided at a panel of a vehicle so as to cover a service hole formed in the panel, and that is shaped as a box whose lower side is open; and a ceiling portion that structures an upper portion of the cover main body, and that is convex toward a panel side, a concave portion that is groove-shaped and whose end portions are open being formed in a top surface of the ceiling portion.

In the service hole cover of the first aspect, the ceiling portion of the cover main body of the service hole cover is convex toward the panel side, and the groove-shaped concave portion is formed in the top surface thereof. Accordingly, in a case in which load is inputted to the ceiling portion from above, the ceiling portion deforms with compressive force being applied thereto. Further, also in a case in which load is inputted to the ceiling portion from beneath, the ceiling portion deforms with compressive force being applied thereto. In cases in which the ceiling portion compressively deforms in this way, it is difficult for damage such as cracks or fissures or the like to arise thereat and the strength improves, as compared with, for example, a case in which the ceiling portion tensilely deforms.

Further, because the concave portion of the top surface of the ceiling portion is a groove shape whose end portions are open, even if water enters into the concave portion at the ceiling portion, water is drained-out from the both end portions of the concave portion. Accordingly, deterioration, that is due to water collecting in the concave portion of the ceiling portion over a long period of time, is suppressed or prevented.

In this way, the groove-shaped concave portion that is formed in the ceiling portion has two functions that are a function of improving strength and a draining function. Accordingly, the strength of the service hole cover is improved while the draining performance of the top surface of the service hole cover is ensured.

In a service hole cover of a second aspect, in the structure of the first aspect, a bottom portion of the concave portion is inclined downward while heading from a central portion in a groove direction toward both end portions, or is inclined downward while heading from one end portion in the groove direction, toward another end portion.

In the service hole cover of the second aspect, the bottom portion of the concave portion is inclined downward while heading from the central portion in the groove direction toward the both end portions, or is inclined downward while heading from one end portion in the groove direction toward the other end portion. Accordingly, water that has entered into the concave portion flows along the incline and is drained-out from both end portions or the other end portion, and therefore, the draining performance improves.

In a service hole cover of a third aspect, in the structure of the first aspect or the second aspect, first ribs that extend along a side wall height direction are formed at outer surfaces of side walls of the cover main body.

In the service hole cover of the third aspect, deformation of the side walls is suppressed and the strength of the service hole cover is further improved, by the first ribs that are formed at the outer surfaces of the side walls of the cover main body and extend along the side wall height direction.

Further, because the first ribs are formed at the outer surfaces of the side walls of the service hole cover, in a case in which a member is disposed at the upper side of the top surface of the service hole cover, the member can be placed near to the top surface.

A unit mounting structure for a vehicle of a fourth aspect comprises: a vehicle floor in which a service hole is formed; an operation portion that is provided at a unit for a vehicle disposed at a lower side in a vehicle vertical direction of the vehicle floor, and that projects-out toward the service hole; the service hole cover of any one aspect of the first aspect through the third aspect, removably provided at a top surface of the vehicle floor; a duct that is disposed at a vehicle vertical direction upper side of the service hole cover; and an elastic member that is nipped between the duct and the service hole cover.

In the unit mounting structure for a vehicle of the fourth aspect, the groove-shaped concave portion, that is formed in the ceiling portion of the cover main body of the service hole cover, has two functions that are a function of improving strength and a draining function. Accordingly, the strength of the service hole cover is improved while the draining performance of the top surface of the service hole cover is ensured.

Accordingly, damage to the service hole cover, that is due to, for example, impact caused by dropping of tools onto the top surface of the ceiling portion of the service hole cover, or impact due to collision of the operation portion with the bottom surface of the ceiling portion due to vibrations, or the like, is prevented or suppressed, and deterioration of the service hole cover, that is due to water collecting in the concave portion over a long period of time, is prevented or suppressed.

Further, in a case in which the first ribs are formed at the outer surfaces of the side walls of the cover main body, the strength of the service hole cover improves. Moreover, the duct, that is disposed at the vehicle vertical direction upper side of the service hole cover, can be set close to the top surface of the service hole cover.

Further, a buffering member is nipped between the ceiling portion of the service hole and the duct. Accordingly, because the ceiling portion of the service hole cover and the duct hit via the buffering member due to vibrations at the time of traveling or the like, the impact is buffered, and damage to the service hole cover and the duct is prevented.

In a service hole cover of a fifth aspect, in the structure of any one aspect of the first aspect through the third aspect, second ribs, that extend along an intersecting direction that intersects a groove direction of the concave portion, are formed at the top surface of the ceiling portion of the cover main body, and drainage portions, that pass through in the groove direction, are formed at regions of the second ribs which regions are formed at the concave portion.

In the service hole cover of the fifth aspect, deformation of the ceiling portion is suppressed and the strength of the service hole cover is further improved, by the second ribs that are formed at the top surface of the ceiling portion of the cover main body and extend along an intersecting direction that intersects the groove direction of the concave portion.

Further, because water flows and is drained-out from the drainage portions of the second ribs, the draining performance is ensured even though the second ribs are formed at the top surface of the ceiling portion.

In a service hole cover of a sixth aspect, in the structure of the fifth aspect, the second ribs are formed such that upper end portions thereof do not go past an upper end portion of the top surface of the ceiling portion.

In the service hole cover of the sixth aspect, the upper end portions of the second ribs do not go past the upper end portion of the top surface of the ceiling portion. Therefore, in a case in which a member is disposed at the upper side of the top surface of the service hole cover, the member can be placed near to the top surface.

In a service hole cover of a seventh aspect, in the structure of any one aspect of the first aspect through the third aspect, the fifth aspect and the sixth aspect, third ribs, that extend along a side wall height direction, are formed at inner surfaces of side walls of the cover main body.

In the service hole cover of the seventh aspect, deformation of the side walls is suppressed and the strength of the service hole cover is further improved, by the third ribs that are formed at the inner surfaces of the side walls of the cover main body and extend along the side wall height direction.

Further, in a case in which a member is disposed at the upper side of the top surface of the service hole cover, the member can be placed near to the top surface.

In a service hole cover of an eighth aspect, in the structure of any one aspect of the first aspect through the third aspect and the fifth aspect through the seventh aspect, fourth ribs, that extend along an intersecting direction that intersects a groove direction of the concave portion, are formed at a bottom surface of the ceiling portion of the cover main body.

In the service hole cover of the eighth aspect, deformation of the ceiling portion is suppressed and the strength of the service hole cover is further improved, by the fourth ribs that are formed at the bottom surface of the ceiling portion of the cover main body and extend along an intersecting direction that intersects the groove direction of the concave portion.

Further, in a case in which a member is disposed at the upper side of the top surface of the service hole cover, the member can be placed near to the top surface.

A unit mounting structure for a vehicle of a ninth aspect comprises: a vehicle floor in which a service hole is formed; an operation portion that is provided at a unit for a vehicle disposed at a lower side in a vehicle vertical direction of the vehicle floor, and that projects-out toward the service hole; and the service hole cover of any one aspect of the first aspect through the third aspect and the fifth aspect through the eighth aspect, removably provided at a top surface of the vehicle floor.

In the unit mounting structure for a vehicle of the ninth aspect, the concave portion, that is formed in the ceiling portion of the cover main body of the service hole cover and is convex downward and is groove-shaped at the top surface, has two functions that are a function of improving strength and a draining function. Accordingly, the strength of the service hole cover is improved while the draining performance of the top surface of the service hole cover is ensured.

Accordingly, damage to the service hole cover, that is due to, for example, impact caused by dropping of tools onto the top surface of the ceiling portion of the service hole cover, or impact due to the operation portion colliding with the bottom surface of the ceiling portion due to vibrations, or the like, is prevented or suppressed, and deterioration of the service hole cover, that is due to water collecting in the concave portion over a long period of time, is prevented or suppressed.

Advantageous Effects of Invention

In accordance with the first aspect, the strength of the service hole cover can be improved while the draining performance of the top surface of the service hole cover is ensured.

In accordance with the second aspect, the draining performance can be further improved.

In accordance with the third aspect, the strength of the service hole cover can be further improved.

In accordance with the fourth aspect, damage due to impact to the service hole cover and deterioration of the service hole cover can be prevented or suppressed, and a duct, that is disposed at the vehicle vertical direction upper side of the service hole cover, can be placed near to the top surface of the service hole cover.

In accordance with the fifth aspect, the strength of the service hole cover can be further improved.

In accordance with the sixth aspect, a member can be placed near to the top surface of the service hole cover.

In accordance with the seventh aspect, the strength of the service hole cover can be further improved.

In accordance with the eighth aspect, the strength of the service hole cover can be further improved.

In accordance with the ninth aspect, damage due to impact to the service hole cover and deterioration of the service hole cover can be prevented or suppressed.

DESCRIPTION OF EMBODIMENTS

A service plug cover and a unit mounting structure for a vehicle relating to an embodiment of the present invention are described hereinafter with reference to the drawings. Note that arrow FR that is shown appropriately in the respective drawings indicates the front side in the vehicle longitudinal direction (the vehicle front side), arrow UP indicates the upper side in the vehicle vertical direction, and arrow OUT indicates an outer side in the vehicle transverse direction.

Figure 1:
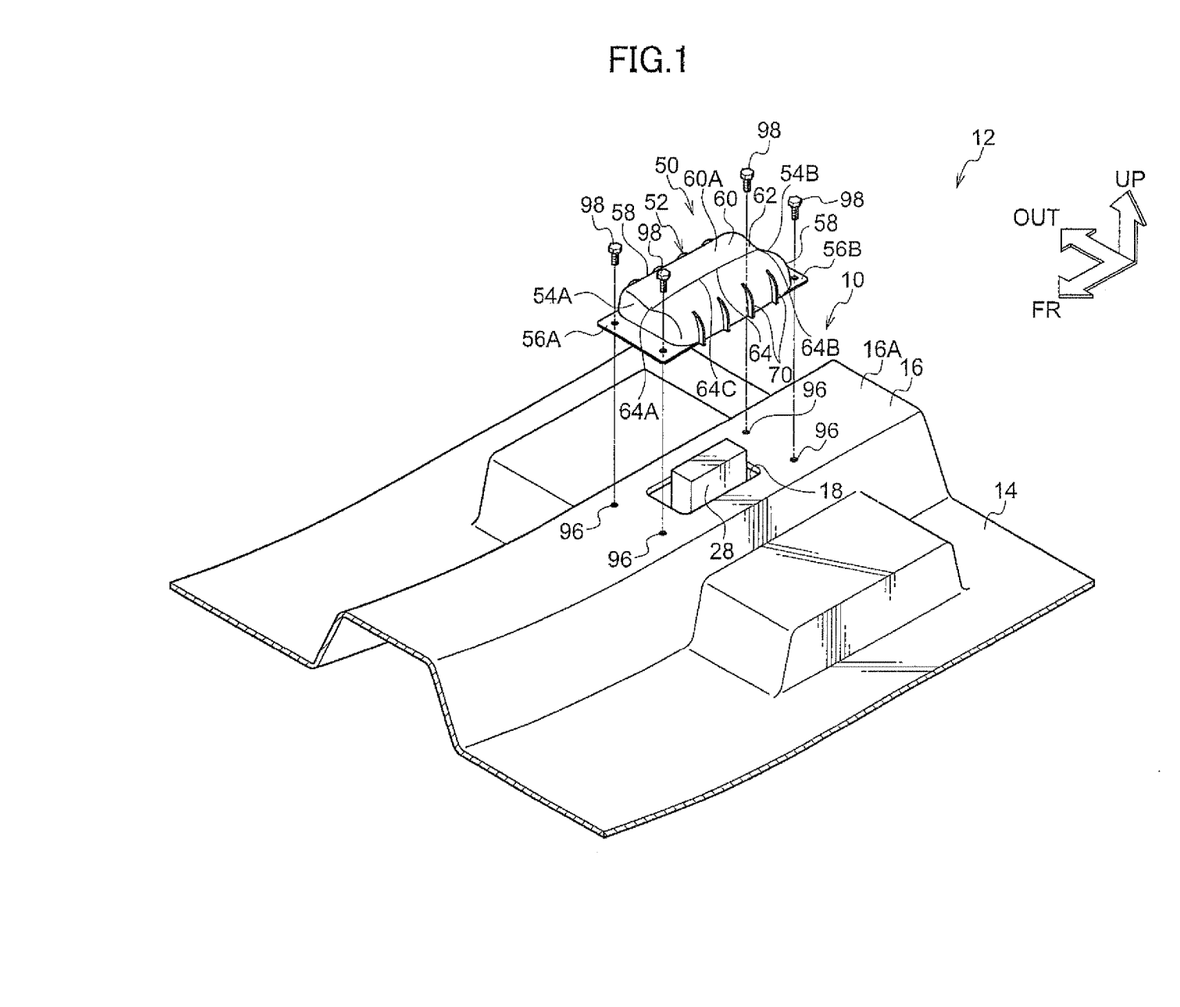
FIG. 1 is a perspective view of a state in which a service plug cover has been removed from a floor panel of a vehicle to which a unit mounting structure for a vehicle relating to a present embodiment is applied.
Figure 2:
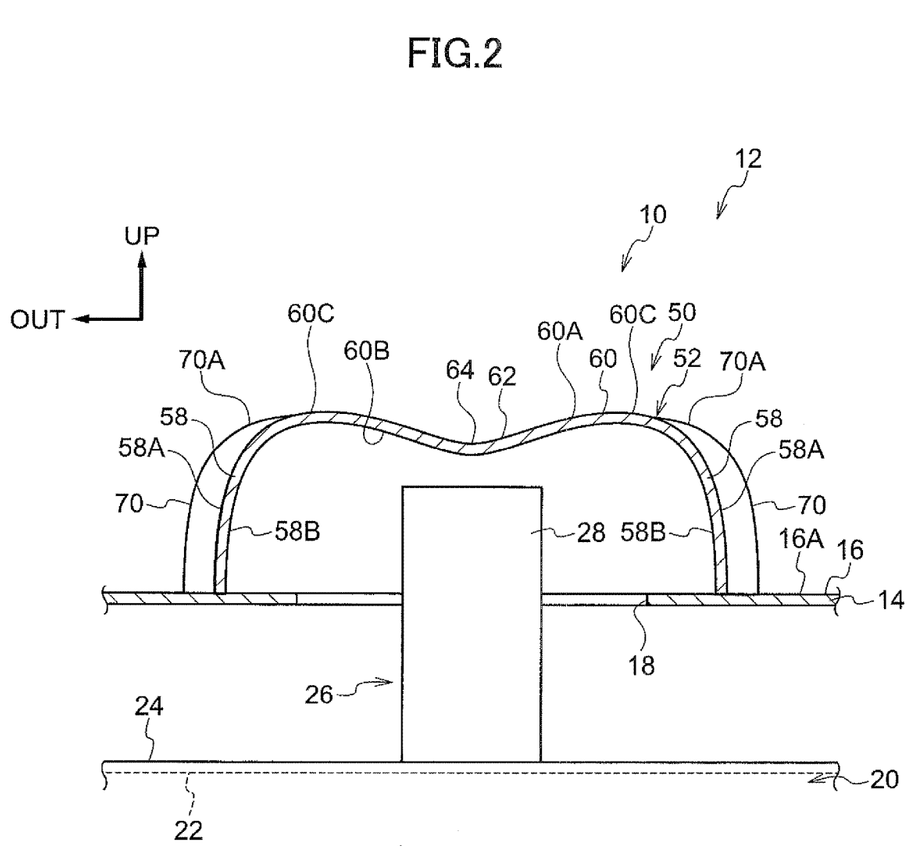
FIG. 2 is a vertical sectional view, along a vehicle transverse direction, of main portions of the unit mounting structure for a vehicle.
Figure 3:
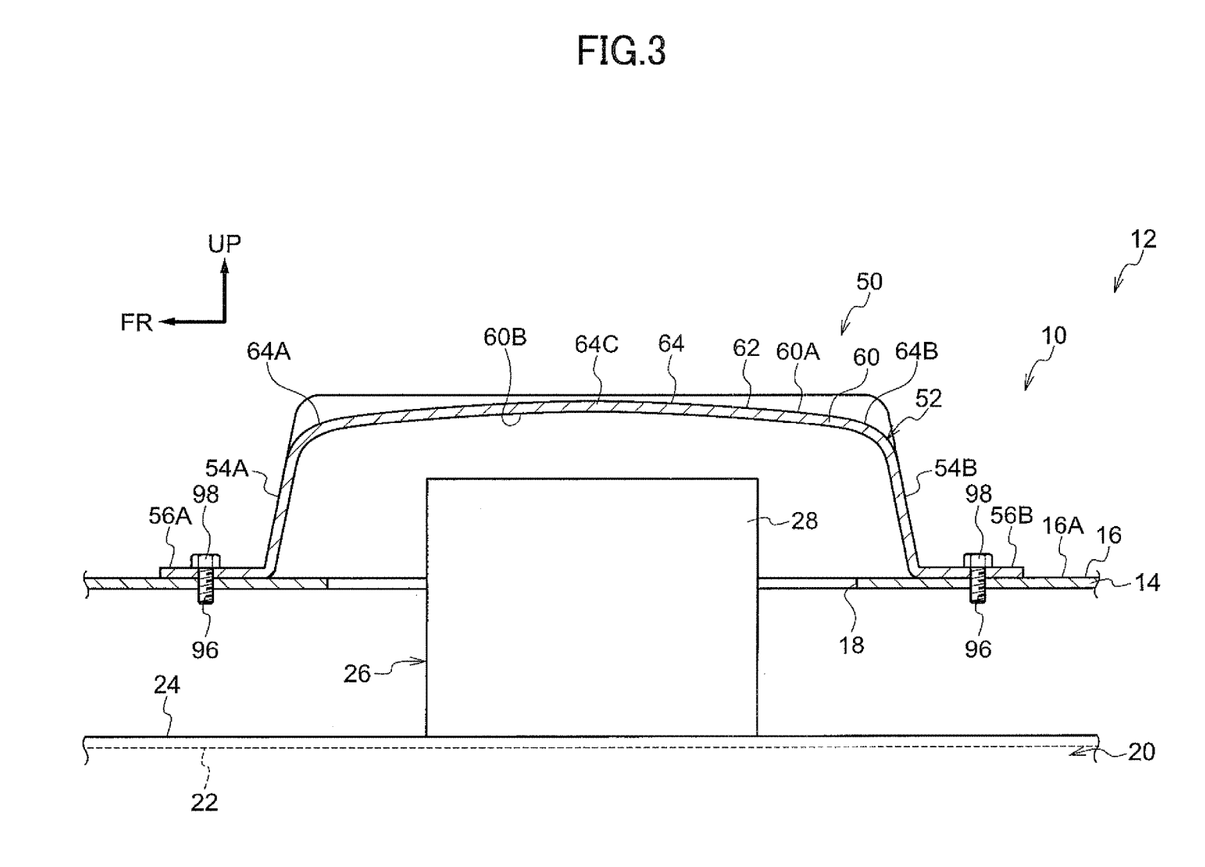
FIG. 3 is a vertical sectional view, along a vehicle longitudinal direction (groove direction), of main portions of the unit mounting structure for a vehicle.

As shown in FIG. 1 through FIG. 3, a vehicle 12, to which a unit mounting structure 10 for a vehicle relating to the present embodiment is applied, is for example an electric automobile, a gasoline hybrid vehicle, a fuel cell hybrid vehicle, or the like that travels by using an unillustrated electric motor (motor) as the drive source. A battery unit 20 (see FIG. 2), that serves as an example of a unit for a vehicle and that stores electric power to be supplied to the electric motor, is mounted to the lower side in the vehicle vertical direction of a floor panel 14 that structures the vehicle floor. Note that the battery unit 20 in the present embodiment is a fuel cell that produces electric power by electrochemical reaction.

As shown in FIG. 1, a convex portion 16 is provided at the floor panel 14. This convex portion 16 projects-out in a convex form toward the upper side in the vehicle vertical direction with respect to the general portion (reference surface) of the floor panel 14. A service hole 18 is formed in a top wall portion 16A of the convex portion 16.

Note that this service hole 18 is closed-off from the upper side in the vehicle vertical direction by a service plug cover 50 that is made of resin and that serves as an example of a service hole cover that is described later.

As shown in FIG. 2 and FIG. 3, the battery unit 20 is disposed at the lower side in the vehicle vertical direction of the floor panel 14. The battery unit 20 has a battery module 22, a battery case 24 that houses the battery module 22, and an electrical circuit cut-off device 26 that is provided at the upper portion of the battery case 24. The battery case 24 is mounted via an unillustrated connecting member to a skeleton member that structures the skeleton of the vehicle lower portion. Note that the battery module 22 is housed within the battery case 24.

Note that, in FIG. 2 and FIG. 3, the battery module 22, the battery case 24 and the electrical circuit cut-off device 26 are illustrated schematically.

As shown in FIG. 2 and FIG. 3, the electrical circuit cut-off device 26 has a service plug 28 that serves as an example of an operation portion. As shown in FIG. 1 through FIG. 3, the service plug 28 projects-out upwardly from the service hole 18. The service plug 28 is covered, from the upper side in the vehicle vertical direction, by the service plug cover 50 that closes-off the above-described service hole 18.

As shown in FIG. 1 through FIG. 3, the service plug cover 50 that is made of resin has a cover main body 52 that is shaped as a box whose lower side is open, and that bulges-out toward the vehicle vertical direction upper side (the side opposite the floor panel 14). Further, as shown in FIG. 1, the cover main body 52 is formed in a substantially rectangular shape whose length direction is the vehicle longitudinal direction, as seen in plan view.

As shown in FIG. 1 and FIG. 3, flange portions 56A, 56B, that extend in the vehicle longitudinal direction from lower end portions respectively, are formed at a front side wall 54A and a rear side wall 54B in the vehicle longitudinal direction of the cover main body 52. Further, at these flanges 56A, 56B, the service plug cover 50 is fixed to the floor panel 14 due bolts 98 being screwed-in and fastened to screw holes 96 that are formed in the floor panel 14 at the outer peripheral portion of the service hole 18. Note that, although not illustrated, the flanges 56A, 56B, that are provided at substantially middle levels of the front side wall 54A and the rear side wall 54B of the cover main body 52, may be fixed to unillustrated brackets that are crank-shaped and are fixed to the floor panel 14. Moreover, an unillustrated sealing member may be interposed between the lower end of the cover main body 52 and the floor panel 14.

Figure 4:
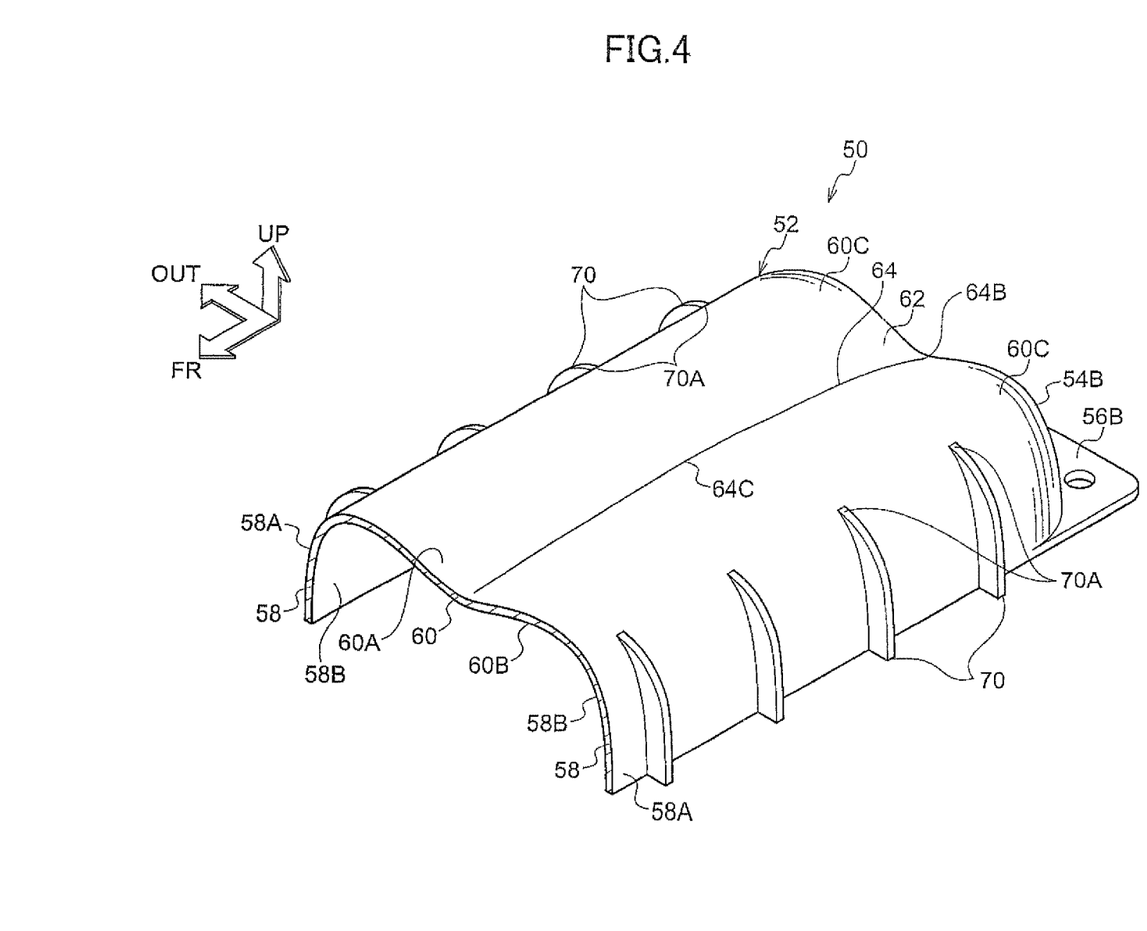
FIG. 4 is a perspective view showing the service plug cover in a partial cross-section.

As shown in FIG. 1, FIG. 2 and FIG. 4, a ceiling portion 60, that structures the upper portion of the cover main body 52 of the service plug cover 50, is convex toward the vehicle vertical direction lower side (the floor panel 14 side (FIG. 1 and FIG. 2), and a concave portion 62 that is groove-shaped is formed in a top surface 60A. End portions 62A, 62B of this groove-shaped concave portion 62 are open, and the concave portion 62 is formed with the vehicle longitudinal direction being the groove direction thereof.

Further, as shown in FIG. 2, the cross-sectional shape orthogonal to the groove direction of the concave portion 62 (the vehicle longitudinal direction) is a circular arc shape that is convex toward the lower side. Moreover, as shown in FIG. 3, a bottom portion 64 (see FIG. 2) of the concave portion 62 is inclined downward while heading from a central portion 64C toward end portions 64A, 64B in the vehicle longitudinal direction (see FIG. 1 and FIG. 4 as well). In other words, the cross-sectional shape, along the vehicle longitudinal direction, of the bottom portion 64 of the concave portion 62 is the shape of a mountain at which the central portion 64C in the groove direction swells toward the upper side.

Note that, in FIG. 3, the center (middle) in the groove direction of the concave portion 62 (the vehicle longitudinal direction) is the peak portion of the mountain. However, there may be a shape in which the peak portion of the mounting is positioned further toward the vehicle longitudinal direction front side or the vehicle longitudinal direction rear side than the center (middle).

As shown in FIG. 1, FIG. 2 and FIG. 4, ribs 70, that respectively extend along the vehicle vertical direction (the height direction of side walls 58), are formed at outer surfaces 58A of the side walls 58 of the vehicle transverse direction both outer sides of the cover main body 52 of the service plug cover 50. The plural ribs 70 are formed at the outer surfaces 58A of the side walls 58 at intervals in the vehicle longitudinal direction.

Further, as shown in FIG. 2 and FIG. 4, upper end portions (uppermost portions) 70A of the ribs 70 are formed so as to not go past upper end portions (uppermost portions) 60C of the top surface 60A of the ceiling portion 60 of the cover main body 52.

Figure 5:
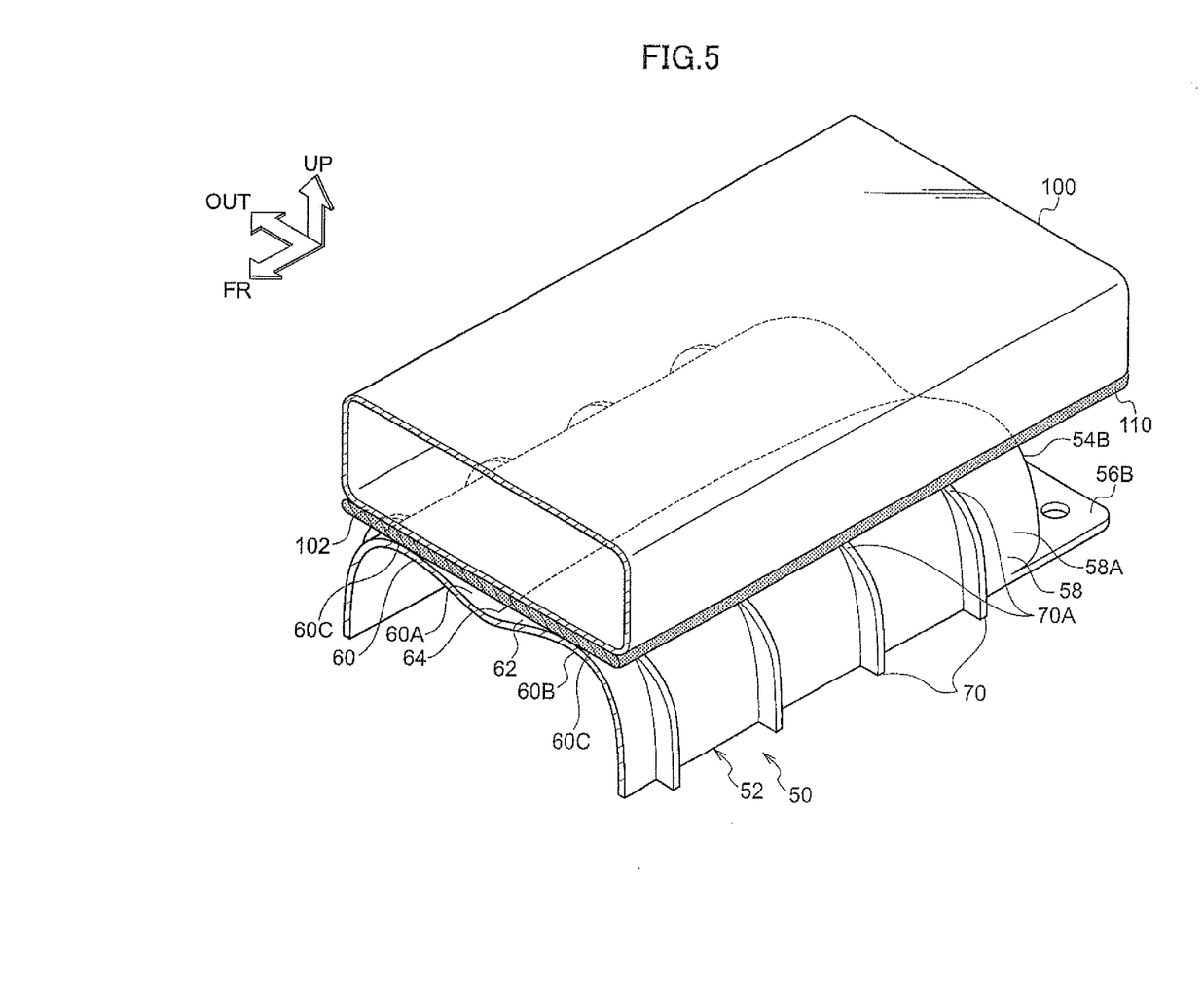
FIG. 5 is a perspective view showing a state in which a duct has been placed at an upper side of the service plug cover of FIG. 4.

As shown in FIG. 5, a duct 100 that extends along the vehicle longitudinal direction is disposed at the vehicle vertical direction upper side of the service plug cover 50. Air that has been conditioned by an unillustrated air conditioner flows in this duct 100. Note that the air conditioned air that flows in this duct 100 is blown-out toward passengers seated in an unillustrated rear seat.

The top surface 60A of the ceiling portion 60 of the cover main body 52 of the service plug cover 50 and a bottom surface 102 of the duct 100 are disposed near one another. Further, a sponge 110 that serves as an example of a buffering member is provided at the bottom surface 102 of the duct 100. Accordingly, the sponge 110 is nipped-in, in a state of being elastically deformed in the vehicle vertical direction, between the top surface 60A of the ceiling portion 60 of the cover main body 52 of the service plug cover 50 and the bottom surface 102 of the duct 100.

Note that the vehicle vertical direction upper side of the service plug cover 50 (the duct 100) is covered by an unillustrated console.

<Operation and Effects>

Operation and effects of the present embodiment are described next.

At the time of carrying out maintenance of the battery unit 20 or the like, the fastening of the bolts 98 is released, the service plug cover 50 is removed, and the service plug 28 of the electrical circuit cut-off device 26 of the battery unit 20 is exposed (see FIG. 1). The service plug 28, that is exposed from the vehicle cabin inner side, is operated, and the electrical circuits of the battery module 22 housed in the battery case 24 are electrically cut-off, and maintenance work of the battery unit 20 or the like is carried out.

When the maintenance work of the battery unit 20 has ended, the service plug 28 of the electrical circuit cut-off device 26 of the battery unit 20 is operated from the vehicle cabin inner side and is energized. Then, the service plug cover 50 is fastened to the floor panel 14 by the bolts 98.

Figure 6A:
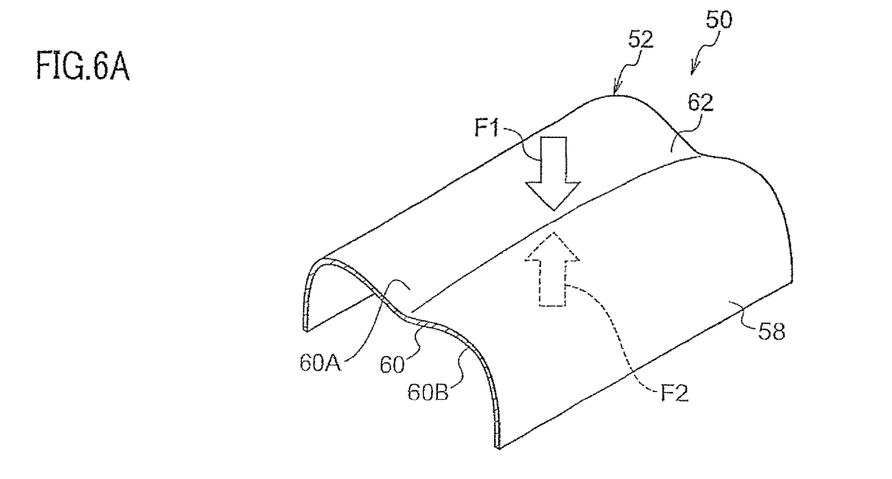
FIG. 6A is a perspective view for explaining load that is applied to a ceiling portion of a cover main body of the service plug cover.
Figure 6B:
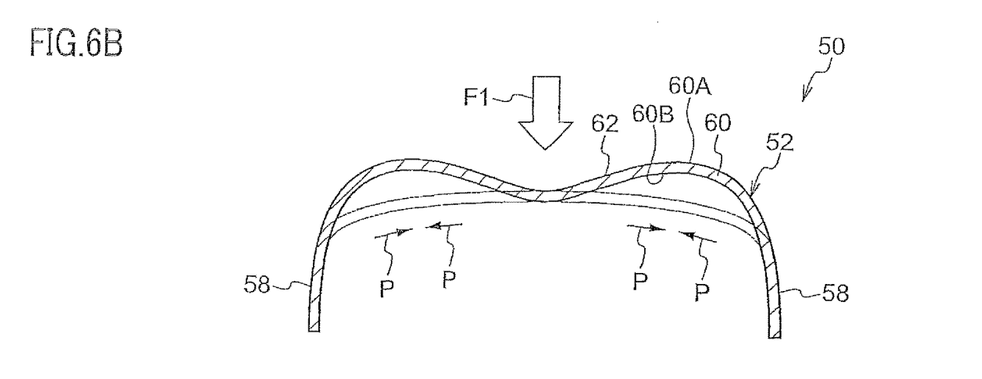
FIG. 6B is a vertical sectional view, along the vehicle transverse direction, for explaining deformation of the ceiling portion in a case in which load is inputted from above to the ceiling portion of the cover main body of the service plug cover.

At times of such maintenance, there are cases in which tools are dropped and hit the top surface 60A of the ceiling portion 60 of the service plug cover 50 that is made of resin and load is inputted to the ceiling portion 60 from above (refer to arrow F1 of FIG. 6A, FIG. 6B).

Further, there are cases in which, due to vibrations or impact or the like at the time when the vehicle travels, the service plug 28 hits a bottom surface 60B of the ceiling portion 60 and load is inputted to the ceiling portion 60 from beneath (refer to arrow F2 of FIG. 6A, FIG. 6B).

Figure 6C:
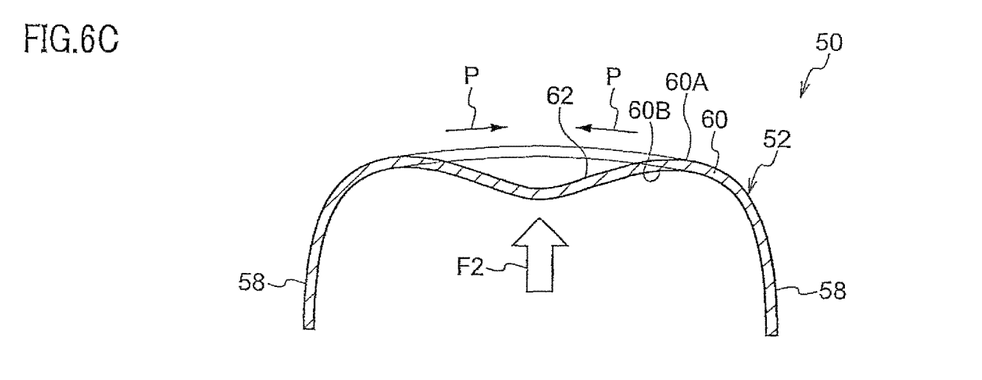
FIG. 6C is a vertical sectional view, along the vehicle transverse direction, for explaining deformation of the ceiling portion in a case in which load is inputted from beneath to the ceiling portion of the cover main body of the service plug cover.
Figure 10A:
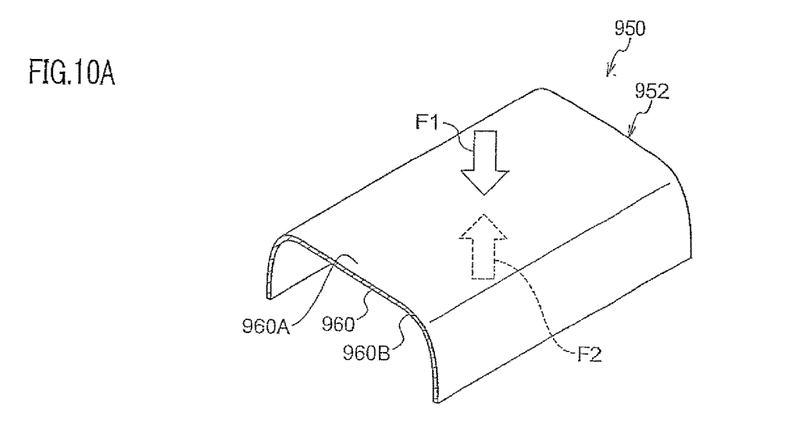
FIG. 10A is a perspective view for explaining load that is applied to a ceiling portion of a cover main body of a service plug cover of a comparative example.
Figure 10B:
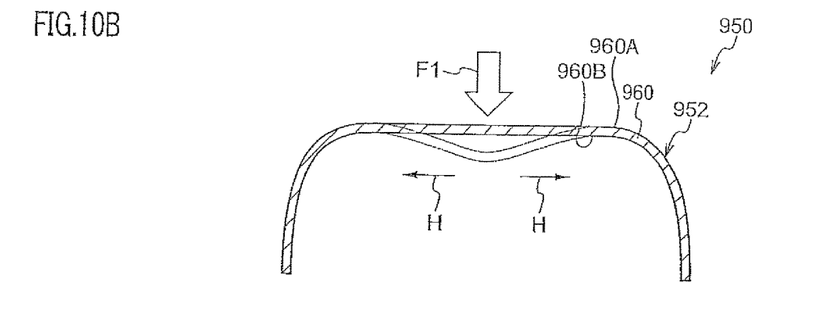
FIG. 10B is a vertical sectional view, along the vehicle transverse direction, for explaining deformation of the ceiling portion in a case in which load is inputted from above to the ceiling portion of the cover main body of the service plug cover of the comparative example.
Figure 10C:
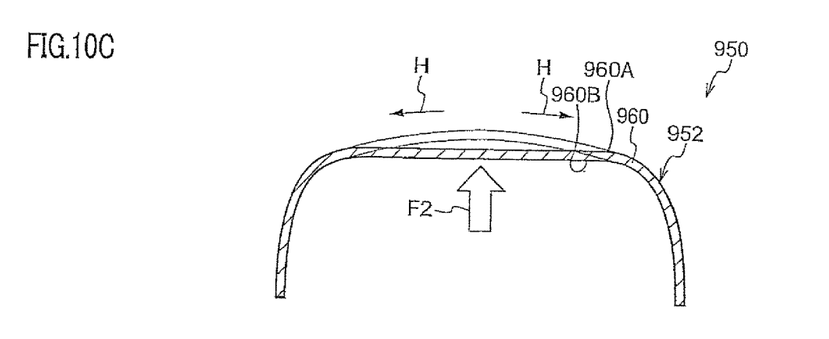
FIG. 10C is a vertical sectional view, along the vehicle transverse direction, for explaining deformation of the ceiling portion in a case in which load is inputted from beneath to the ceiling portion of the cover main body of the service plug cover of the comparative example.

Deformation of the ceiling portion is described here by using FIG. 6A, FIG. 6B, FIG. 6C that show the service plug cover 50 of the present embodiment, and FIG. 10A, FIG. 10B, FIG. 10C that show a service plug cover 950 of a comparative example. Note that the imaginary lines (two-dot chain lines) in the figures illustrate the state in which the ceiling portion has deformed. Further, in FIG. 6A, FIG. 6B, FIG. 6C, only the cover main body 52 of the service plug cover 50 is shown.

In a case in which a ceiling portion 960 of the service plug cover 950 that is made of resin is flat as in the comparative example shown in FIG. 10A, FIG. 10B, FIG. 10C, when load F1 is inputted from above to the ceiling portion 960 of the service plug cover 950 as shown in FIG. 10B, the ceiling portion 960 deforms with tensile force H being applied thereto. Further, when load F2 is inputted from beneath to the ceiling portion 960 of the service plug cover 950 as shown in FIG. 10C, the ceiling portion 960 similarly deforms with the tensile force H being applied thereto. In a case in which the ceiling portion 960 of the service plug cover 950 that is made of resin tensilely deforms in this way, it is easy for damage such as cracks or fissures or the like to arise at the ceiling portion 960.

In contrast, as shown in FIG. 6A, FIG. 6B, FIG. 6C, the ceiling portion 60 of the service plug cover 50 that is made of resin of the present embodiment is convex toward the vehicle vertical direction lower side (the floor panel 14 side), and the concave portion 62 that is groove-shaped is formed in the top surface 60A (refer to FIG. 1 through FIG. 4 as well).

Accordingly, as shown in FIG. 6B, when load F1 is inputted from above to the ceiling portion 60 of the service plug cover 50, the ceiling portion 60 deforms with compressive force P being applied thereto. Note that, in the drawings, it appears as if load F1 is inputted to the bottom portion 64 of the concave portion 62, but, in actuality, when a tool drops, the tool first hits the convex portions, that are convex toward the upper side, at the outer side of the concave portion 62, and therefore, load F1 is inputted to these convex portions. Accordingly, as shown by the imaginary lines (two-dot chain lines), these convex portions deform so as to flatten-out, i.e., deform with the compressive force P being applied thereto.

Further, as shown in FIG. 6C, when load F2 is inputted from below to the ceiling portion 60 of the service plug cover 50, the ceiling portion 60 deforms with the compressive force P being applied thereto.

Further, in a case in which the ceiling portion 60 of the service plug cover 50 that is made of resin of the present embodiment compressively deforms in this way, it is difficult for damage such as cracks or fissures or the like to arise thereat, as compared with a case of tensilely deforming such as the service plug cover 950 of the comparative example that is shown in FIG. 10A, FIG. 10B, FIG. 10C.

Namely, due to the ceiling portion 60 of the service plug cover 50 that is made of resin of the present embodiment being convex toward the vehicle vertical direction lower side (the floor panel 14 side) and the groove-shaped concave portion 62 being formed in the top surface 60A thereof, the strength of the service plug cover 50 improves as compared with a case in which the ceiling portion is flat.

Further, the concave portion 62 of the top surface 60A of the ceiling portion 60 is groove-shaped, and the end portions 62A, 62B thereof in the groove direction (the vehicle longitudinal direction) are open. Accordingly, even if water enters into the concave portion 62 of the ceiling portion 60, water drains-out from the end portions 64A, 64B.

Moreover, the bottom portion 64 of the concave portion 62 is inclined downward while heading from the central portion 64C toward the end portions 64A, 64B in the vehicle longitudinal direction. In other words, the cross-sectional shape, along the vehicle longitudinal direction, of the bottom portion 64 of the concave portion 62 is a mountain shape at which the central portion 64C swells toward the upper side (see FIG. 3). Accordingly, water that has entered into the concave portion 62 flows along the inclines and is drained-out from the end portions 64A, 64B. Accordingly, deterioration, that is due to water collecting in the concave portion 62 of the ceiling portion 60 over a long period of time, is suppressed or prevented. Further, a decrease in strength that accompanies deterioration of the ceiling portion 60 is suppressed or prevented.

In this way, the groove-shaped concave portion 62 of the top surface 60A, that is formed by the ceiling portion 60 being convex toward the vehicle vertical direction lower side (the floor panel 14 side), has two functions that are the function of improving the strength of the service plug cover 50 and a draining function. Accordingly, the strength of the service plug cover 50 is improved while the draining performance of the top surface 60A of the ceiling portion 60 of the service plug cover 50 is ensured.

Further, in the present embodiment, the ribs 70 are formed at the outer surfaces 58A of the side walls 58 of the service plug cover 50. Therefore, deformation of the side walls 58 at times when load F1 and load F2 are applied is suppressed, and the strength of the service plug cover 50 is further improved.

Further, the ribs 70 are formed at the outer surfaces 58A of the side walls 58 of the service plug cover 50, and the upper end portions (uppermost portions) 70A of the ribs 70 do not go past the upper end portions (the uppermost portions) 60C of the top surface 60A of the ceiling portion 60 of the cover main body 52. Accordingly, the bottom surface 102 of the duct 100 can be disposed so as to be near to the top surface 60A of the ceiling portion 60 of the service plug cover 50 (see FIG. 5).

Note that the sponge 110 is nipped between the top surface 60A of the ceiling portion 60 of the service plug cover 50 and the bottom surface 102 of the duct 100. Accordingly, the top surface 60A of the ceiling portion 60 of the service plug cover 50 and the bottom surface 102 of the duct 100 hit via the sponge 110 due to vibrations at the time of traveling or the like, and therefore, the impact is buffered, and damage to the service plug cover 50 and the duct 100 is prevented.

<Modified Examples of Present Embodiment>

Modified examples of the above-described embodiment are described next.

(First Modified Example)

In the above-described embodiment, the ribs 70 are formed at the outer surfaces 58A of the side walls 58 of the service plug cover 50, but the present embodiment is not limited to this.

Figure 7:
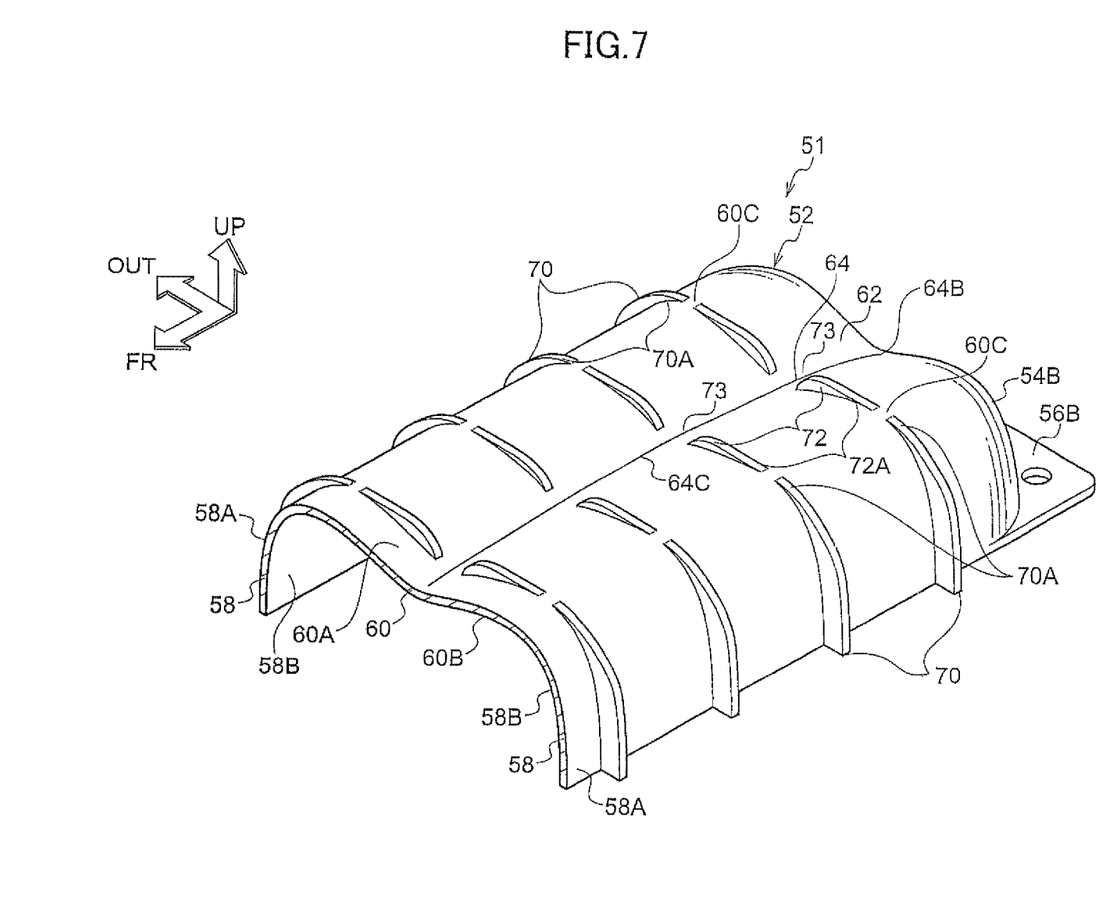
FIG. 7 is a perspective view of a partial cross-section that corresponds to FIG. 4 and illustrates a service plug cover of a first modified example.
Figure 8:
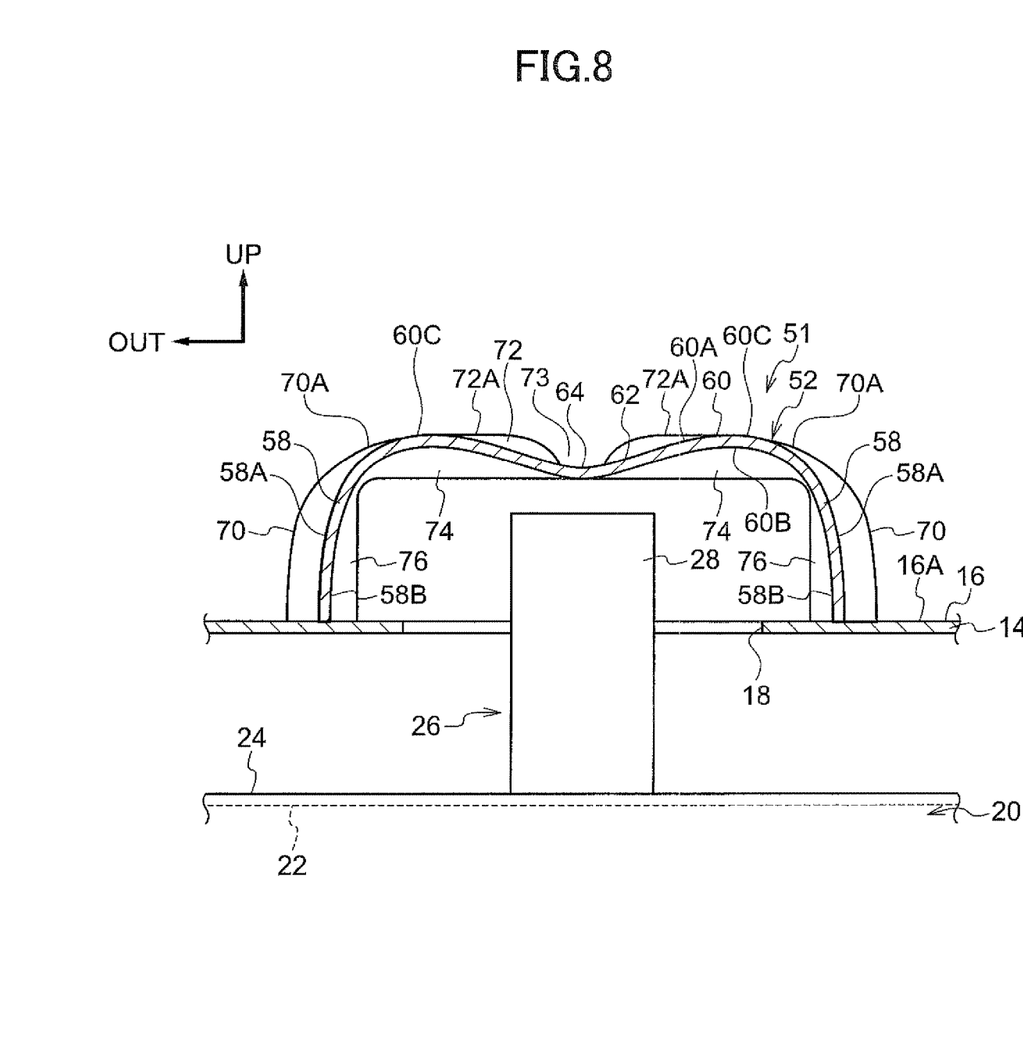
FIG. 8 is a vertical sectional view, along the vehicle transverse direction, that corresponds to FIG. 2 and illustrates the service plug cover of the first modified example.

As at a service plug cover 51 of a first modified example that is shown in FIG. 7 and FIG. 8, ribs 72, that extend along an intersecting direction that intersects the groove direction of the concave portion 62, may be formed at the top surface 60A of the ceiling portion 60, and ribs 74, that extend along an intersecting direction that intersects the groove direction of the concave portion 62, may be formed at the bottom surface 60B of the ceiling portion 60, and ribs 76, that extend along the vehicle vertical direction (the height direction of the side walls 58), may be formed at inner surfaces 58B of the side walls 58. Note that, in the present modified example, the aforementioned intersecting directions are an orthogonal direction that is orthogonal to the groove direction of the concave portion 62, and are the vehicle transverse direction.

Further, these plural ribs 72, 74, 76 are formed at intervals in the groove direction (the vehicle longitudinal direction).

Note that cut-out portions 73 that serve as an example of drainage portions are formed in the ribs 72 that are formed at the top surface 60A of the ceiling portion 60, at regions corresponding to the bottom portion 64 of the concave portion 62. Further, the positions in the vehicle vertical direction of substantially horizontal upper end portions 72A of these ribs 72 are formed so as to not go past the upper end portions 60C of the ceiling portion 60.

In this way, in addition to the ribs 70 of the outer surfaces 58A of the side walls 58 of the service plug cover 50, the ribs 72 are formed at the top surface 60A of the ceiling portion 60, and the ribs 74 are formed at the bottom surface 60B of the ceiling portion 60, and the ribs 76 are formed at the inner surfaces 58B of the side walls 58. Accordingly, deformation of the ceiling portion 60 and the side walls 58 is suppressed, and the strength of the service plug cover 51 is further improved than the service plug cover 50.

Further, because the cut-out portions 73 are formed at the ribs 72 of the top surface 60A of the ceiling portion 60, even if water enters-in between the ribs 72 and the ribs 72, the water flows from the cut-out portions 73 and is ultimately drained-out from the end portions 64A, 64B of the concave portion 62. Accordingly, even though the ribs 72 are formed so as to intersect the concave portion 62 at the top surface 60A of the ceiling portion 60, deterioration that is due to water collecting in the concave portion 62 over a long period of time is suppressed or prevented.

Note that there may be a structure in which, other than the cut-out portions 73, water is drained by, for example, through-holes that pass through in the groove direction.

Further, the positions in the vehicle vertical direction of the upper end portions 72A of the ribs 72 are formed so as to not go past the upper end portions 60C of the ceiling portion 60. Accordingly, the top surface 60A of the ceiling portion 60 of the service plug cover 50 and the bottom surface 102 of the duct 100 can be disposed near one another.

Note that, in cases in which sufficient space can be ensured above, or cases in which an adjacent member is not disposed above, or the like, the height of the ribs 72 of the top surface 60A of the ceiling portion 60 may be formed to be high, or, in other words, the ribs 72 may be formed so as to go past the upper end portions 60C of the ceiling portion 60, and the strength may be further improved.

Further, there may be a structure in which any one of or plural of the four types of ribs that are the ribs 70 of the outer surfaces 58A of the side walls 58, the ribs 72 of the top surface 60A of the ceiling portion 60, the ribs 74 of the bottom surface 60B of the ceiling portion 60, and the ribs 76 of the inner surfaces 58B of the side walls 58, are formed. Or, there may be a structure in which these ribs are not formed.

(Second Modified Example and Third Modified Example)

In the above-described embodiment, due to the ceiling portion 60 on the whole being formed to be convex toward the lower side, the central portion in the vehicle transverse direction of the top surface 60A is recessed, and the one groove-shaped concave portion 62 is formed. However, the above-described embodiment is not limited to this.

Figure 9A:
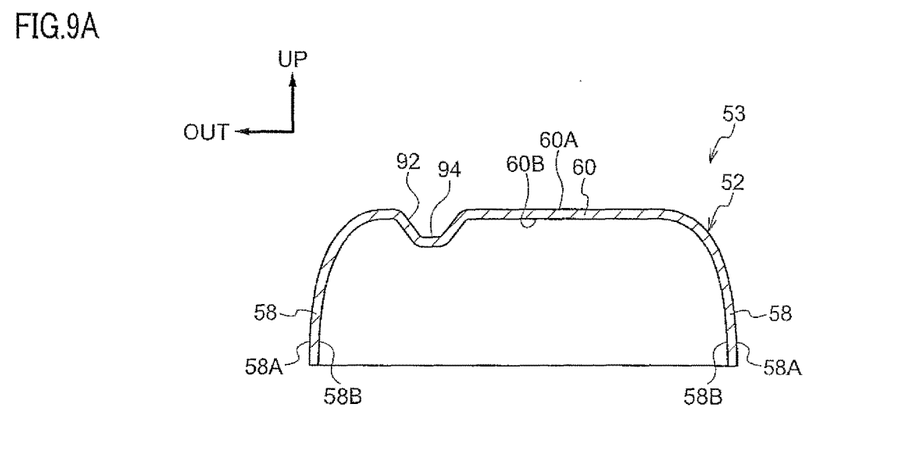
FIG. 9A is a vertical sectional view, along the vehicle transverse direction, that illustrates a service plug cover of a second modified example.

As in a service plug cover 53 of a second modified example that is shown in FIG. 9A, due to a portion of the ceiling portion 60 (a region at a vehicle transverse direction outer side (a region that is offset toward an outer side from the central portion)) being formed to be convex toward the lower side, a concave portion 92 that is groove-shaped may be formed in a region that is at a vehicle transverse direction outer side of the top surface 60A.

Figure 9B:
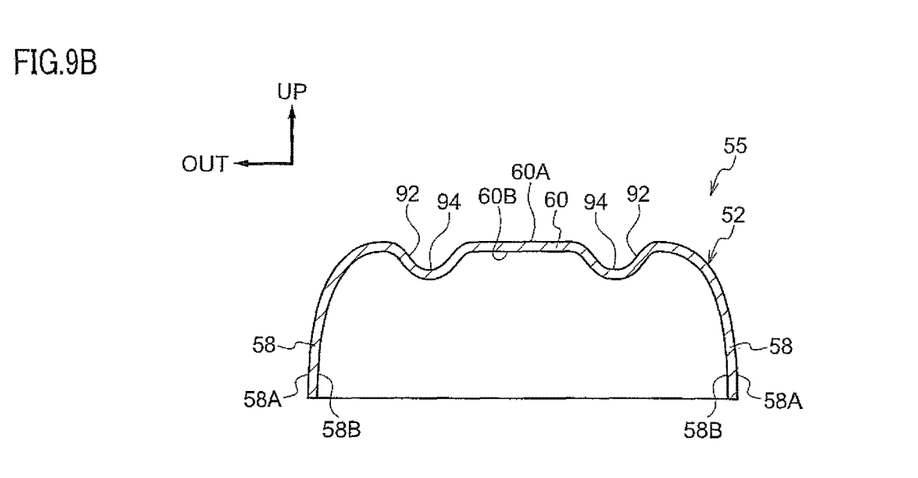
FIG. 9B is a vertical sectional view, along the vehicle transverse direction, that illustrates a service plug cover of a third modified example.

Further, as in a service plug cover 55 of a third modified example that is shown in FIG. 9B, two of the groove-shaped concave portions 92 may be formed in a row. Although not illustrated, three or more of the concave portions 92 may be formed in a row.

Note that the draining performance may be improved by inclining bottom portions 94 of these concave portions 92 as well downwardly while heading from the central portion in the groove direction toward the both end portions, such as at the concave portion 62 of the above-described embodiment (see FIG. 3).

Further, also at the service plug cover 53 of the second modified example that is shown in FIG. 9A and the service plug cover 55 of the third modified example that is shown in FIG. 9B, any one of or plural of the ribs 70 of the outer surfaces 58A of the side walls 58, the ribs 76 of the inner surfaces 58B of the side walls 58, the ribs 72 of the top surface 60A of the ceiling portion 60, and the ribs 74 of the bottom surface 60B of the ceiling portion 60 may be formed such as at the service plug cover 51 of the second modified example that is shown in FIG. 7 and FIG. 8. Note that the cut-out portions 73 are formed at the ribs 72 of the top surface 60A of the ceiling portion 60 at regions corresponding to the bottom portion 94 of the concave portion 92, and the draining performance is ensured.

<Other Points>

Note that the present invention is not limited to the above-described embodiment.

For example, in the above-described embodiment and modified examples, the sponge 110 is nipped between the top surface 60A of the ceiling portion 60 of the service plug cover 50 and the bottom surface 102 of the duct 100, but the present invention is not limited to this. It suffices for there to be a member having a buffering function (impact absorbing function) that prevents damage to the service plug cover 50 and the duct 100. For example, there may be an elastic member such as rubber or the like, or felt or foamed styrol or the like.

Further, for example, although the groove-shaped concave portion 62, 92 is formed along the vehicle longitudinal direction in the top surface 60A of the ceiling portion 60 in the above-described embodiment and modified examples, the present invention is not limited to this. A groove-shaped concave portion may be formed along the vehicle transverse direction, or a groove-shaped concave portion may be formed obliquely at an angle with respect to the vehicle longitudinal direction.

Moreover, there may be a structure in which plural groove-shaped concave portions intersect. For example, a concave portion that runs along the vehicle longitudinal direction and a concave portion that runs along the vehicle transverse direction may be formed in the ceiling portion so as to intersect.

Further, in the above-described embodiment and modified examples, the draining performance is improved due to the bottom portion 64, 94 of the groove-shaped concave portion 62, 92 being inclined downwardly from the central portion in the groove direction toward the both end portions. However, the present invention is not limited to this. The draining performance may be improved due to the bottom portion 64, 94 of the concave portion 62, 92 being inclined downwardly from one end portion in the groove direction toward the other end portion. Note that, in this case, it suffices for at least the other end portion of the concave portion to be open.

Moreover, the bottom portion 64, 94 of the concave portion 62, 92 may be formed substantially horizontally. Note that, even if the bottom portion 64, 94 of the concave portion 62, 92 is substantially horizontal, water is drained from the end portions at the time of vibrating while traveling or at the time of traveling on an inclined road.

Further, in the above-described embodiment and modified examples, the service plug cover 50 is removably provided at the floor panel 14 due to the bolts 98 being screwed-in and fastened to the screw holes 96 that are formed in the floor panel 14 at the outer peripheral portion of the service hole 18. However, the present invention is not limited to this.

For example, weld nuts may be provided at the floor panel 14 at the outer peripheral portion of the service hole 18, and fastened by bolts. Or, stud bolts may be provided at the floor panel 14 at the outer peripheral portion of the service hole 18, and fastened by nuts. Or, the service plug cover may be fastened by clips. To summarize, it suffices for the service plug cover to be provided removably at the floor panel (the vehicle floor).

Further, in the above-described embodiment and modified examples, the service plug cover (service hole cover) covers a service hole that is formed in order to operate the service plug (operation portion) of the battery unit (vehicle battery) that is disposed at the lower side in the vehicle vertical direction of the floor panel (vehicle floor). However, the present invention is not limited to this.

The service hole cover may be a service hole cover that covers a service hole that is formed in order to operate an operation portion other than a service plug. Moreover, in addition, the present invention can also be applied to service hole covers that cover service holes that are formed at panels of vehicles in order to carry out various types of work.

Moreover, it goes without saying that the present invention can be implemented in various forms within a scope that does not depart from the gist of the present invention.

The invention claimed is:

1. A service hole cover comprising:
   a cover main body that is removably provided at a panel of a vehicle so as to cover a service hole formed in the panel, the cover main body being shaped as a box having a lower side that is open; and
   a ceiling portion that forms an upper portion of the cover main body, the ceiling portion of the cover main body being convex in a direction projecting away from the panel of the vehicle, the ceiling portion including a concave portion projecting towards the panel of the vehicle, the concave portion being formed in a center portion of a top surface of the ceiling portion, the concave portion being groove-shaped and having end portions that are open in a longitudinal direction of the service hole cover.

2. The service hole cover of claim 1, wherein a bottom portion of the concave portion is inclined downward while heading from the center portion in a groove direction toward both end portions, or the bottom portion of the concave portion is inclined downward while heading from one end portion in the groove direction, toward another end portion.

3. The service hole cover of claim 1, further comprising first ribs that extend along a side wall height direction that are formed at outer surfaces of side walls of the cover main body.

4. A unit mounting structure for a vehicle comprising:
a vehicle floor in which a service hole is formed;
an operation portion that is provided at a unit for the vehicle disposed at a lower side in a vehicle vertical direction of the vehicle floor, the operation portion projecting-out towards the service hole;
the service hole cover of claim 1, removably provided at a top surface of the vehicle floor;
a duct that is disposed at a vehicle vertical direction upper side of the service hole cover; and
a buffering member that is provided at a duct side, the buffering member being nipped between the duct and the service hole cover.

5. The service hole cover of claim 1, further comprising:
second ribs that extend along an intersecting direction that intersects a groove direction of the concave portion, the second ribs being formed at the top surface of the ceiling portion of the cover main body; and
drainage portions that pass through in the groove direction, the drainage portions being formed at regions of the second ribs that are formed at the concave portion.

6. The service hole cover of claim 5, wherein the second ribs are formed such that upper end portions of the second ribs do not extend past an upper end portion of the top surface of the ceiling portion.

7. The service hole cover of claim 1, further comprising third ribs that extend along a side wall height direction, the third ribs being formed at inner surfaces of side walls of the cover main body.

8. The service hole cover of claim 1, further comprising fourth ribs that extend along an intersecting direction that intersects a groove direction of the concave portion, the fourth ribs being formed at a bottom surface of the ceiling portion of the cover main body.

9. A unit mounting structure for a vehicle, the unit mounting structure comprising:
a vehicle floor in which a service hole is formed;
an operation portion that is provided at a unit for the vehicle disposed at a lower side in a vehicle vertical direction of the vehicle floor, the operation portion projecting-out towards the service hole; and
vice hole cover of claim 1, removably provided at a top surface of the vehicle floor.

* * * * *